(12) United States Patent
Hiramatsu et al.

(10) Patent No.: US 6,464,328 B1
(45) Date of Patent: Oct. 15, 2002

(54) INK JET RECORDING APPARATUS

(75) Inventors: Soichi Hiramatsu, Hachioji; Makoto Kashimura, Yokohama; Yuji Nakano, Kawasaki, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/466,904

(22) Filed: Dec. 20, 1999

(30) Foreign Application Priority Data

Dec. 22, 1998 (JP) ............................................ 10-365478
Dec. 22, 1998 (JP) ............................................ 10-365479

(51) Int. Cl.[7] .............................................. B41J 2/165
(52) U.S. Cl. ...................................................... 347/34
(58) Field of Search .............................. 347/34, 18, 83, 347/93

(56) References Cited

U.S. PATENT DOCUMENTS 5,528,271 A * 6/1996 Ebisawa ...................... 347/34
5,774,141 A * 6/1998 Cooper et al. ................ 347/34

FOREIGN PATENT DOCUMENTS

JP          8-238784         9/1996

* cited by examiner

*Primary Examiner*—John Barlow
*Assistant Examiner*—S. Hsieh
(74) *Attorney, Agent, or Firm*—Fitzpatrick, Cella, Harper & Scinto (57) ABSTRACT

An ink jet recording apparatus, which forms images on a recording medium using an ink jet recording head to discharge ink onto the medium to record the image. The recording material is carried and ink mist generated at the time of image recording flows along an air path in a specific direction. Electric field formation members arranged for the wall faces of the air path. With the structure thus arranged, effective mist collection is possible Without making the pressure loss of the air flow unduly large. stains that would otherwise result in the interior of the recording apparatus can be prevented, hence avoiding the deposition of ink mists on parts that may cause the defective operation particularly due to the deposition of such stains. Then, it becomes possible to record images stably for a long time, and the reliability of the ink jet recording apparatus is enhanced significantly.

12 Claims, 6 Drawing Sheets

INK JET RECORDING APPARATUS

BACKGROUND OF THE INVENTION

1. Field of the Invention

The present invention relates to an ink jet recording apparatus that records images by discharging ink onto a recording material. More particularly, the invention relates to the removal of ink mists which are generated when ink is discharged.

2. Related Background Art

The conventional ink jet recording apparatus is capable of providing high quality images, but when images are recorded by discharging ink onto a recording material, ultrafine ink particles, which are called ink mists, are generated. Such ultrafine ink mists may sometimes spread in the interior of the recording apparatus to caused it stained with them. Then, it is conceivable that such ink mist stains produce unfavorable effects on various parts in the interior of the recording apparatus. For example, if recording material carrier means is stained, it may result in the stains on the recording material or if the optical sensor or the like is stained, an inappropriate detection may ensue eventually. If the guide members of the carriage for a serial recording apparatus or the like should be stained, resistance may increase to the driving of the carriage, hence inviting the defective operation, among some others.

In order to suppress the spreading of the ink mists of the kind, there has been known a structure for the removal of the generated mists, which is provided with the fan and filters in the ink jet printer as disclosed in the specification of Japanese Patent Application Laid-Open No. 08-238784. For the filters of the kind, it is arranged to overlap a filter having fine gaps with a filter having rough gaps. Then, the fine gap filter uses an electrostatically charged cloth, which is structured in a folded form like a fan with pleats or in a wavy form in order to increase the mist filtering effect, while suppressing the influence that may be exerted on the air flow that passes the filter.

However, with an ink jet printer of the kind, it is necessary to enforce the collector capability to collect mists sufficiently by making the gaps of filters more minute or by adopting some other means. Then, a problem is encountered that the loss of the air flow that passes the filter becomes greater and the suction efficiency is lowered. Further, if the use time is longer, filtered mists are allowed to adhere to the filter and clog the gaps thereof, thus resulting in more loss of the flow of air that passes. Therefore, the filters should be replaced per use of a specific period of time.

SUMMARY OF THE INVENTION

With a view to solving the problems discussed above, the present invention is designed. It is an object of the invention to provide a method for removing ink mists, which is capable of collecting them in the interior of an ink jet recording apparatus without making the quantitative loss greater for the flow of air that passes, and then, to prevent the defective operation or the like due to the stains adhering to various members in the apparatus, thus making it possible to provide a highly reliable ink jet recording apparatus having a longer life, which is capable of performing image recording stably.

It is another object of the invention to provide a method for removing ink mists by collecting ink mists that float in the interior of an ink jet recording apparatus by the application of static electricity in order to suck and collect them efficiently in the ink jet recording apparatus without making the loss greater for the air flow that passes.

It is still another object of the invention to provide an ink jet recording apparats for forming images on a recording material by use of recording means for recording images by discharging ink, comprising carrier means for carrying the recording material; ink mist removal means for enabling the ink mists generated at the time of image recording by recording means to flow in a specific direction; and electric field formation members arranged for the wall faces of the ink mist removable means in the flowing passage of the ink mists.

Other objectives and advantages besides those discussed above will be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

Figure 1:
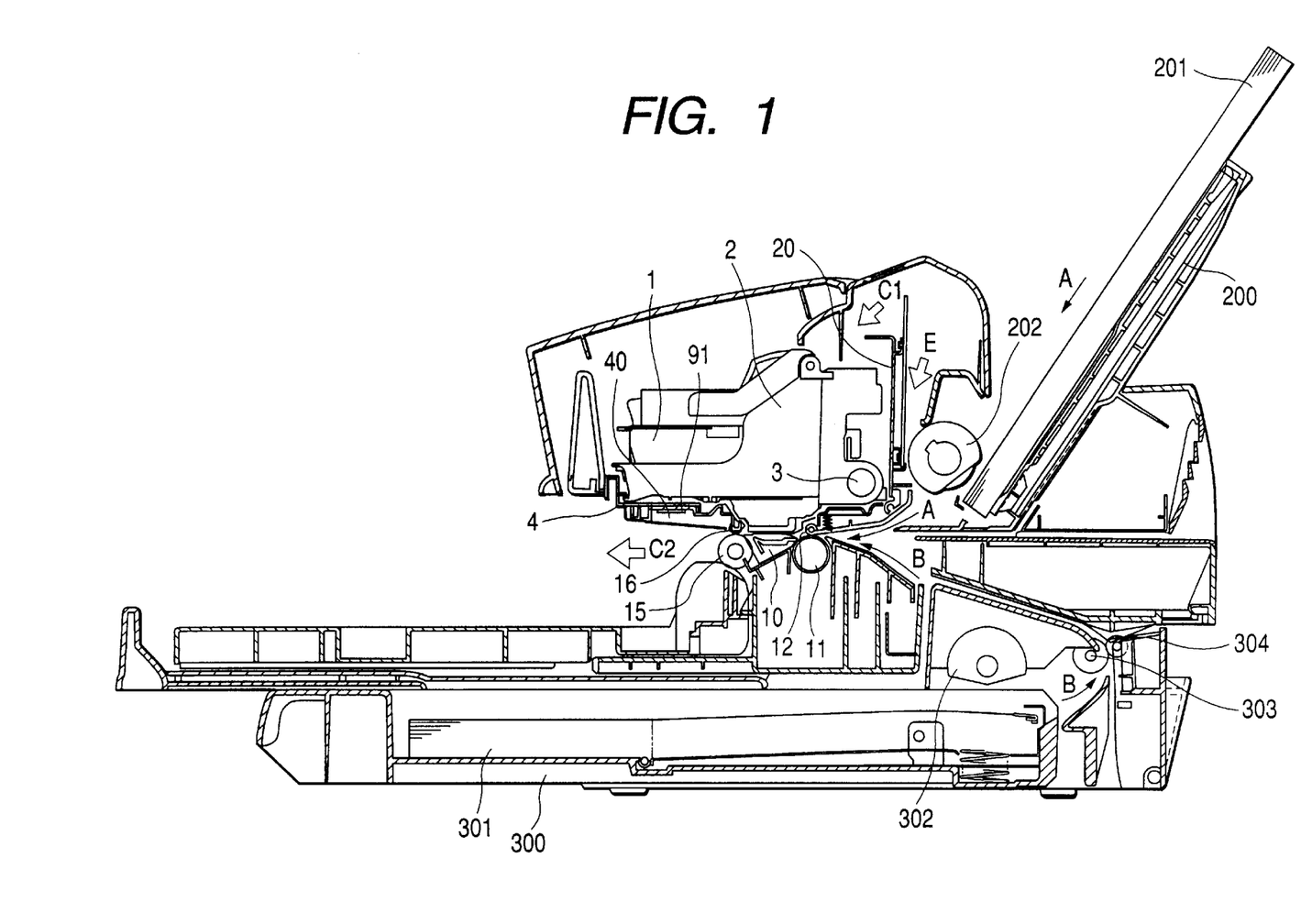
FIG. 1 is a side sectional view which shows an ink jet recording apparatus in accordance with one embodiment of the present invention.
Figure 2:
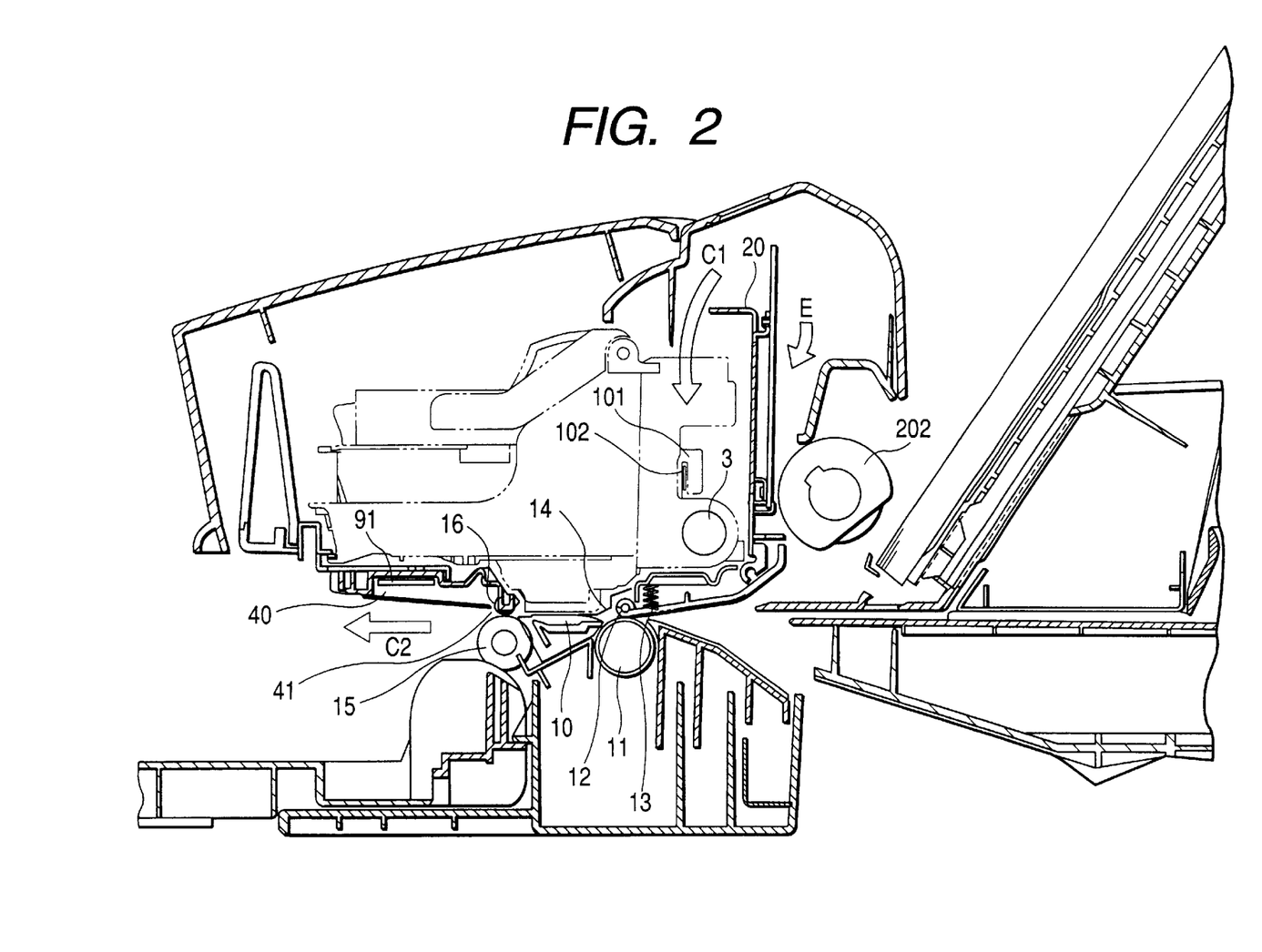
FIG. 2 is an enlarged view which shows the circumferential part of the recording unit in accordance with the embodiment represented in FIG. 1.
Figure 3:
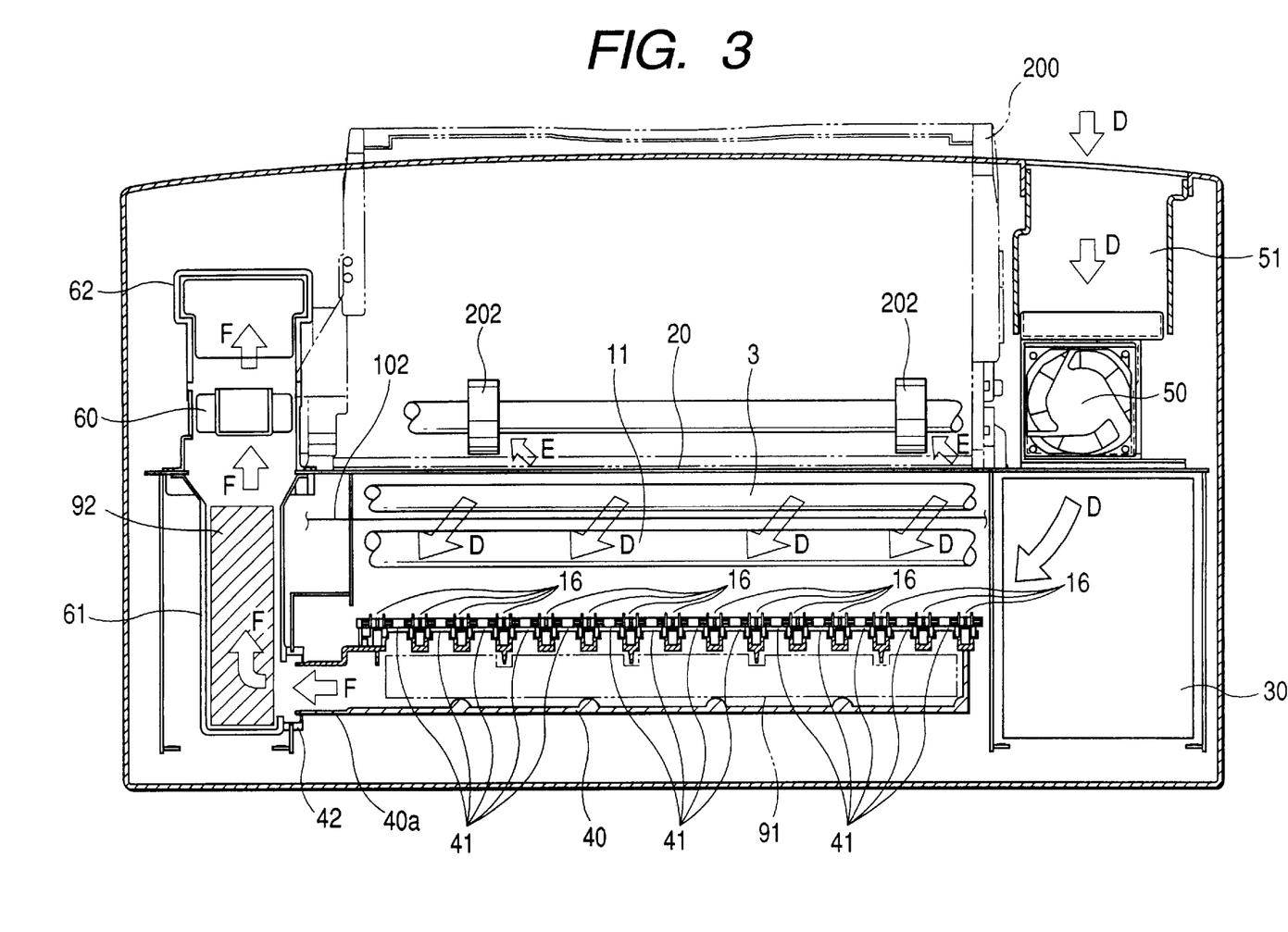
FIG. 3 is a plan view which shows the first embodiment represented in FIG. 1.
Figure 4:
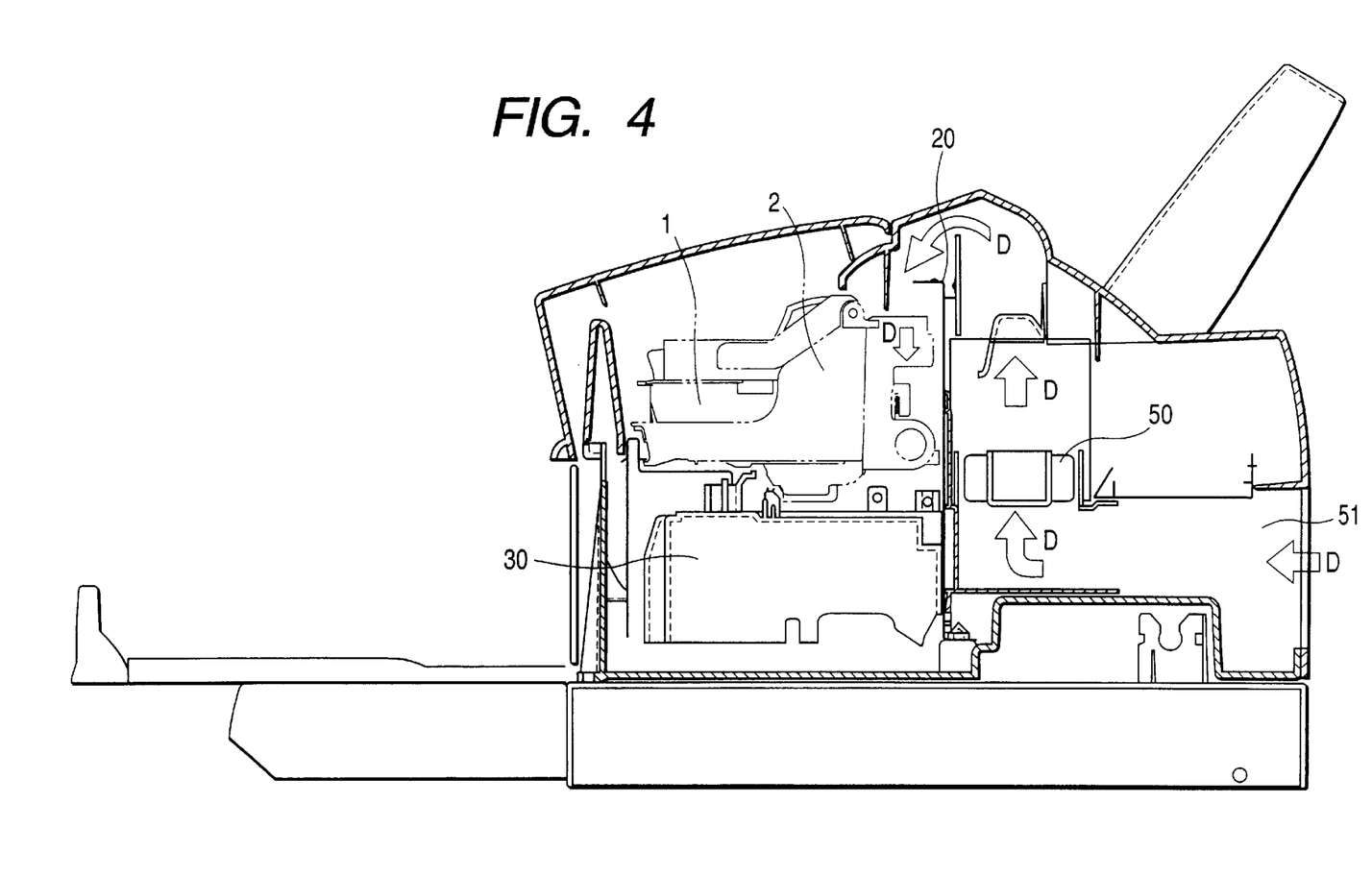
FIG. 4 is a side sectional view which shows the circumferential portion of the blow off fan in accordance the embodiment represented in FIG. 1.
Figure 5:
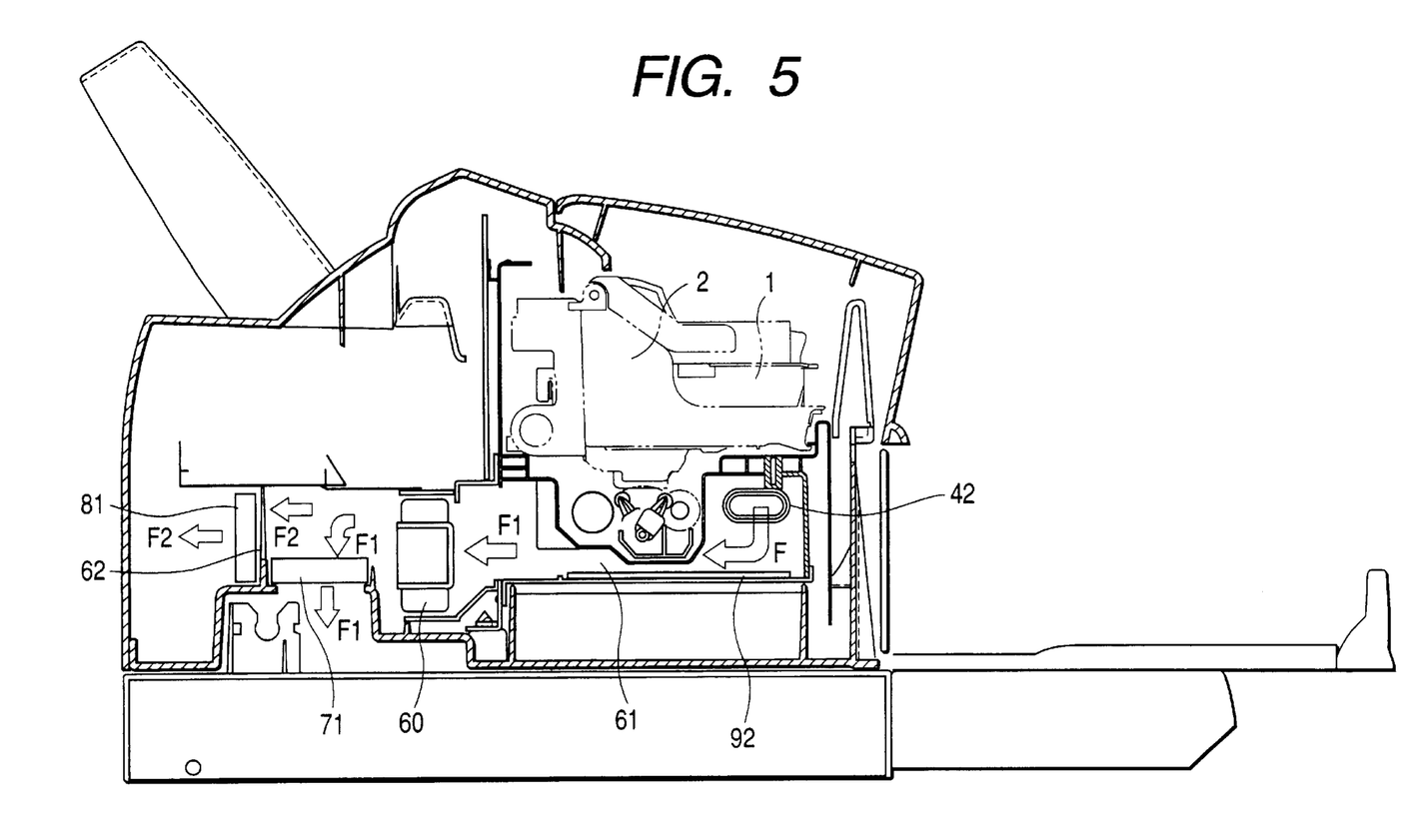
FIG. 5 is a side sectional view which shows the circumferential portion of the suction fan in accordance with the first embodiment represented in FIG. 1, (observed from the side opposite to those shown in FIG. 1 and FIG. 4).

Hereinafter, with reference to the accompanying drawings, the detailed description will be made of one embodiment in accordance with the present invention. FIG. 1 is a cross-sectional view which schematically shows an ink jet recording apparatus in accordance with one embodiment of the present invention. FIG. 2 is an enlarged view which shows the circumferential part of the recording unit thereof. FIG. 3 is a plan view which shows the inner structure thereof. FIG. 4 is a cross-sectional view which schematically shows the part including the fan on the entrance side. FIG. 5 is a cross-sectional view which schematically shows the part including the face on the exit side, observed from the side opposite to those shown in FIG. 1 and FIG. 4.

At first, the structure of an ink jet recording apparatus will be described in accordance with the present embodiment. The ink jet recording apparatus is provided with carrying means for carrying a recording material; recording means for recording images on the recording material; and means for removing ink mists.

To describe the structure of recording means, the recording head 1 that discharges ink is mounted on a carriage 2 as shown in FIG. 1. For the head 1, the ink jet type head is adopted, which obtains discharge energy by heading ink by means of heating elements to bubble it in the flow paths. The carriage 2 is supported by the carriage shaft 3 and the guide rail 4. Then, by use of the carriage driving motor (a DC motor) which is not shown, the carriage is driven to reciprocate through the belt (a timing belt). On the carriage 2, a reading sensor 101 (an optical reading sensor, for example) is mounted, which reads the scale 102 (an optical encoder slit portion, for example) which is provided for the printer chassis of the ink jet recording apparatus, thus detecting the position of the carriage 2 in the width direction of a recording material (the direction at right angles to the carrying direction).

One side (the right side in FIG. 3) of the printer chassis 20 shown in FIG. 3 in the width direction of the recording material (that is, the direction at right angles to the carrying direction of the recording material) is designated to be the standard side in order to position the carriage 2 and others, and the other side (the left side in FIG. 3) is designated to be non-standard side. Then, in front of the printer chassis on the standard side, there is arranged the recovery unit 30 which is provided with the suction recovery function to recover the function of the recording head 1 and maintain the performance thereof, as well as with the wiper function that wipes the ink discharge port formation surface of the recording head 1.

Now, the description will be made of the structure of the carrying means. For the carrying means, an automatic sheet feeder 200 and a cassette 300 are arranged to house stacks of recording sheets 201 and 301. As shown in FIG. 1 and FIG. 2, there are arranged on the recording medium carrier path from the automatic sheet feeder 200 the sheet feed roller 202 which separates the stacked recording material one by one; the carrier roller 11 which is driven to rotate by means of a sheet feed driving motor (not shown); and the pinch roller 12 which presses the recording material to the carrier roller 11 by use of the biasing spring 13. On the sheet feeding carrier path from the cassette 300, there are arranged the pickup roller 302 that separates the recording material one by one from the stack 301 of the recording material; the feed roller 303 which is driven to rotate; and the driven roller that presses the recording material to the feed roller 303. With these members, the structure is arranged to guide the recording material to the positions of the aforesaid carrier roller 11 and the pinch roller 12.

On the downstream side of the carrier roller 11 and the pinch roller 12, the sheet pressure plate 14 is arranged as shown in FIG. 2 in order to prevent the recording material from floating in the recording unit 10, and the discharge port formation surface of the recording head 1 from being in contact with the surface of the recording material, and at the same time, to keep the gap constantly between the ink discharge port formation surface and the surface of the recording material. Further, on the downstream side of the recording unit 10, there are arranged the sheet exhaust roller 15 which is driven to rotate, and the spur 16 which presses the recording material to the sheet exhaust roller 15.

In this respect, the printer chassis 20 positions and holds the aforesaid carriage shaft 3, the guide rail 4, the automatic sheet feeder 200, the carriage motor (the DC motor) which is not shown, the sheet feed motor, the control device, and others. Also, the printer chassis holds the carrier roller 11, and the sheet exhaust roller 15 rotatively.

Now, the structure of the ink mist removal means will be described. In the interior of the ink jet recording apparatus, the fans 50 and 60 are arranged to generate the air flow in order to remove the ink mists that may be generated when the recording means discharges ink for recording images. Specifically, the entrance side fan 50 that blows out the air to the recording unit 10 is arranged on the upstream side of the recording unit 10 in the carrying direction of the recording material, and the exit side fan 60 that sucks the air from the recording unit 10 and exhausts it to the outside is arranged on the downstream side of the recording unit 10 in the carrying direction of the recording material. As indicated by the arrows C1 and C2 in FIG. 1, the structure is arranged so as to produce the air flow in the same direction as the carrying direction of the recording material.

Also, as shown in FIG. 3, the fan 50 is fixed behind the standard side of the printer chassis 20 (on the right side in FIG. 3). In the interior of the ink jet recording apparatus, the air induction duct 51 is arranged, and the fan 50 induces the air from the outside of the ink jet recording apparatus through the air induction duct 51.

On the other hand, as shown in FIG. 2, the suction port 41 that sucks ink mists is arranged for the spur base 40 that holds the spur 16 which is the rotational member that carries the recording material by being in contact with the ink adhesion surface thereof after the ink jet recording. As shown in FIG. 3, the suction port 41 is arranged in the vicinity of the recording unit 10 between the spurs 16. In the interior of the spur base 40, the air flow path is formed, and on the aforesaid non-standard side, the joint unit 40a is arranged for connection with the fan 60. The ink mist suction port 41 is arranged on the position away from the joint unit 40a of the spur base 40.

On the non-standard side of the ink jet recording apparatus, the rubber joint 42 is arranged and inserted into the joint unit 40a of the spur base 40 to be firmly coupled. Then, in front of the printer chassis 20 on the non-standard side, the relay duct 61 is fixed to be firmly coupled with the joint unit 40a through the rubber joint 42.

For the relay duct 61 of the printer chassis 20, the opening is arranged corresponding to the fan 60. The fan 60 is fixed on the back side of the printer chassis 20. Further, in back of the fan 60, the fan duct 62 is arranged to branch out the air flow from the fan 60 and lead it out to the back side and the lower side of the ink jet recording apparatus.

On the wall face (the ceiling portion) of the air flow path in the spur base 40, a first collector sheet 91 is attached as the electric field formation member. On the wall face (the bottom portion) of the air flow path in the interior of the relay duct 61, a second collector sheet 92 is attached as the electric filed formation member. The collector sheets 91 and 92 are formed by unwoven electret fibers to make it possible to collect ink mists of comparatively smaller diameter by the application of static electricity. The electret is the substance that can form electric field around by holding the electric polarization by itself semipermanently so as to maintain static electric power semipermanently.

As shown in FIG. 5, a first filter 71 is arranged for the passage of the fan duct 62 to the lower part of the ink jet recording apparatus, and a second filter 81 is arranged for the passage to the back side of the ink jet recording apparatus, respectively.

Figure 6:
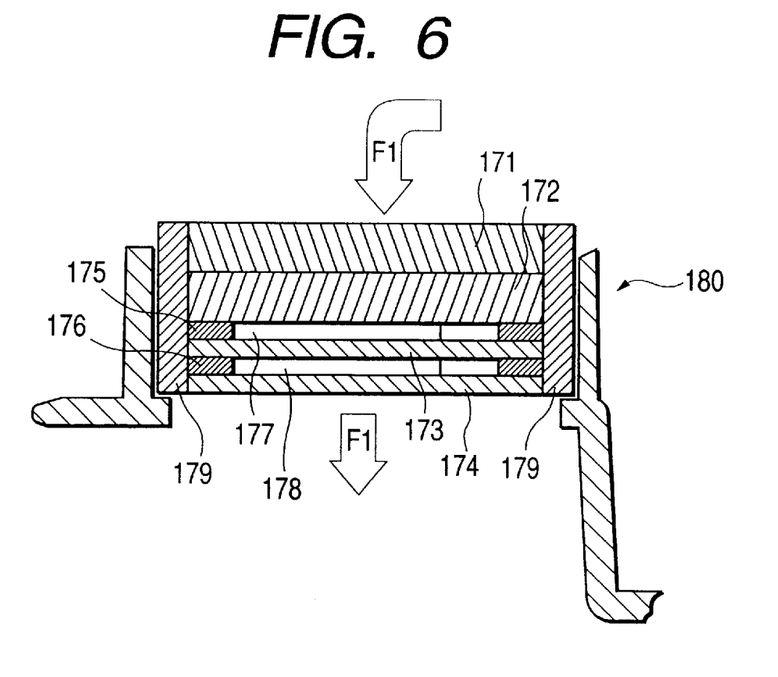
FIG. 6 is an enlarged view which shows a filter unit.
Figure 7:
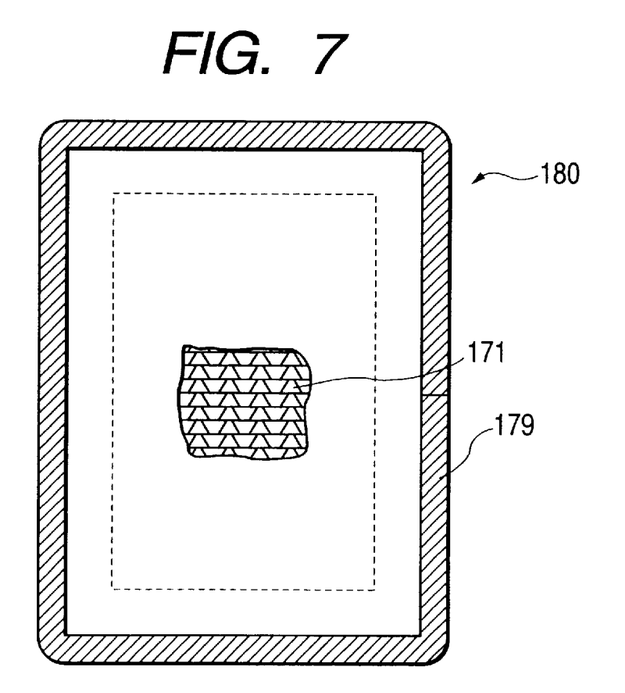
FIG. 7 is a plan view which shows the filter unit represented in FIG. 6, observed from above.

In accordance with the filter unit 181 is used as the filter 71 and filter 81. FIG. 6 is a cross-sectional view which shows this unit in detail. FIG. 7 is the plan view thereof, observed from above in FIG. 6.

The honeycombed type filters 171 and 172 are formed by bonding together the aforesaid unwoven electret fibers in the form of honeycombed (in the form of corrugated board). The air passes the spaces thereof (the air passage holes) to adsorb the charged dust particles. The two honeycomb type filters 171 and 172 are laminated each having different direction of the passage holes, hence bending the air distribution passages.

The sheet type filters 173 and 174 are formed by the unit of unwoven electret fibers, which are arranged so that the air flow penetrates the unwoven fibers. The sheet type filters 173 and 174 are formed by the unwoven fibers in the rougher density having a better air permeability than the fibers used for the honeycomb filters 171 and 172. However, the spaces of these filters are sufficiently smaller than the air passage holes of the honeycomb filters 171 and 172 so that the collector efficiency that may be produced by the inertial collision of ink mists is greater than that of the honeycomb filters 171 and 172.

The spacers 175 and 176 are arranged between the honeycomb filter 172 and the sheet filter 173, and between the sheet filters 173 and 174 to form the gaps 177 and 178. The honeycomb filters 171 and 172, the sheet filters 173 and 174, and spacers 175 and 176 are adhesively fixed in the laminated direction by a double-faced tape or the like on the area arranged for the spacers 175 and 176, for example. Further, on the side faces of the honeycomb filters 171 and 172, the sheet filters 173 and 174, and the spacers 175 and 176, the sponge 179 is adhesively attached to make them integrated, and prevent the air leakage to the side face at the same time. Further, the gap with the portion of the recording apparatus main body where the filter unit 180 is installed is eliminated to prevent the air flow to pass the outer side of the filter unit 180 (here, in FIG. 6, the representation is made to indicate that the gap is present on the circumference of the filter unit 180 for the easier understanding thereof).

Now, the description will be made of the air flow generated by the fans 50 and 60.

At first, through the outside air induction duct 51, the air is induced from the outside, and blown out in the direction indicated by an arrow D in FIG. 3 and FIG. 4, that is, it is brown out upward to the circular ceiling portion arranged for the outer cover of the ink jet recording apparatus. Then, the air flow changes its direction along the circular configuration of the ceiling portion, hence flowing in the direction indicated by the arrow C1 in FIG. 1. Thus, the air flows in the same direction as the carrying direction of the recording material, and then, from the standard side to the non-standard side of the ink jet recording apparatus to pass the recording unit 10. The air thus having passed the recording unit 10 enters the spur space 40 through the ink mist absorption port 41, and flows further in the direction (the direction indicated by an arrow F) toward the relay duct 61 by way of the joint unit 40a and the rubber joint 42. Further, the air passes the fan 60 and the filer unit 80, and exhausted the back side and lower part of the ink jet recording apparatus from the fan duct 62 (see FIG. 3 and FIG. 5).

Now, the operation of the ink jet recording apparatus will be described.

The description will be made along the flow of the recording material (a recording sheet). When the paper sheet is fed from the automatic feeder 200, it is fed from the sheet feed roller 202 along the arrow A. If the paper sheet is fed from the cassette 300, it is fed along the arrow B by means of the pickup roller 302, the feed roller 303, and the driven roller 304. The recording material is then carried to the contact point between the carrier roller 11 and the pinch roller 12 in either case. Then, the carrier roller 11 is driven by the sheet feed driving motor (not shown). The carrier roller 11 rotates in the state where the recording material is pressed to it by means of the biasing spring 13 and the pinch roller 12, hence carrying the recording material to the recording unit 10.

In the recording unit 10, the heat generating elements (not shown) arranged for the recording head are driven in synchronism with the scanning of the carriage 2 in the width direction of the recording material to discharge ink from the recording head 1 onto the recording material appropriately. When one scanning of carriage 2 is complete, the recording material is fed by a given pitch (that is, the portion yet to be printed is fed up to the portion where it faces the recording head 1). Then, the carriage 2 again scans to discharge ink from the recording head 1 for the next line. In this manner, the feeding of the recording material by given pitches, the traveling of the carriage 2, and the ink discharge from the recording head 1 are alternately performed to record on the entire surface of one recording material.

The reciprocation of the carriage 2 is performed in such a manner that the position of the carriage 2 is detected in the width direction of the recording material (that is, in the scanning direction of the carriage 2) by means of the reading sensor 101 and the scale 102, and that in accordance with the position thus detected, the control device (not shown) performs the feedback control of the driving motor. The driving timing of the recording head 1 (timing of the ink discharges) is determined on the basis of the positional data of the carriage 2 obtained by means of the reading sensor 101 and the scale 102. Therefore, in synchronism with the scanning of the carriage 2, the recording head 1 discharges ink.

Here, in the recording unit 10, the floating of the recording material is prevented by the presence of the sheet pressure plate 14, and the ink discharge port formation surface of the recording head 1 is not allowed to be in contact with the recording material, and the gap is kept in a specific value, hence the ink impact positions being made on the recording material in high precision.

The recording material on which images are recorded by the recording head 1 in the recording unit 10 is exhausted to the outside by means of the sheet exhaust roller 15 and the spur 16.

In recent years, there has been demand in making the recorded images in higher precision. Then, to meet such demand, the ink particles discharged from the recording head 1 of the recording unit 10 become smaller in higher density when images are recorded on the recording material. Along with this trend, the amount of the ultrafine ink particles (ink mists) becomes greater when the ink particles are discharged. Thus, there is a fear that the interior of the ink jet recording apparatus is stained by the spread ink mists. As a result, in accordance with the present embodiment, fans 50 and 60 are arranged in the interior of the ink jet recording apparatus to generate the air flow that can induce the ink mists generated on the recording unit 10 in one direction.

As described earlier, in accordance with the present embodiment, the air flow is generated by use of the fan 50 and the fan 60 in the same direction as the carrying direction of the recording material, but it is directed from the aforesaid standard side to the non-standard side of the ink jet recording apparatus. More specifically, the air induced from the air induction duct 51 arrives at the recording unit 10 along with the outer cover, and then, exhausted from the suction fan duct 62 to the back side and the lower part of the ink jet recording apparatus by way of the spur base 40 and the relay duct 61 (see FIG. 3 and FIG. 5).

Arriving at the recording unit 10, the air flow is directed from the standard side to the non-standard side. However, as indicated by the arrow D in FIG. 4, the air flows over the entire area in front of the printer chassis 20 in the width direction of the recording material. Most of this air flow move to the front side of the printer chassis 20 as indicated by the arrow C1 in FIG. 1, that is, move to the recording unit 10 side. However, part of the air flow moves to the back side of the printer chassis 20 (in the direction indicated by the arrow E in FIG. 1), which is blown onto the sheet feed roller 202 of the automatic sheet feeder 200 arranged in back of the printer chassis 20. In this manner, ink mists are blown away to prevent the sheet feed roller 202 from being stained by ink mists, hence making it possible to prevent the surface of recording material from being stained when each material is separated and carried one by one from the stack thereof 201 by means of the sheet feed roller 202.

The air that flows in the direction indicated by the arrow C1 in FIG. 1 is blown onto the recording unit 10 to blow away ink mists to prevent the recording material carrier means arranged on the circumference of the recording unit, that is, the carrier roller 11, the pinch roller 12, the sheet pressure plate 14, and the like, from being stained by ink mists, and then, to prevent the recording material from being stained during its transfer by the stains that may be deposited on these members.

Also, the air that flows in the direction indicated by the arrow C1 in FIG. 1 is blown onto the carriage shaft 3 that guides the carriage 2 having the recording head 1 mounted on it, and the scale 102 (the encoder slit portion) to blow away ink mists, and then, to prevent the sliding load from being increased by the adhesion of ink mists to the carriage shaft 3 when the carriage 2 travels. Also, it becomes possible to prevent the defective reading of the scale 102 that may occur due to the adhesion of ink mists to the scale 102.

Also, the air that flows in the direction indicated by the arrow C1 in FIG. 1 is blown onto the recording head 1 and the carriage 2 to blow away ink mists, hence preventing the defective discharges due to the wetting and the stains resulting from the adhesion of ink mists to the ink discharge port formation surface of the recording head 1, as well as to prevent the defective electrical connection due to the adhesion of ink mists to the electric connection unit (the head contact portion) of the carriage 2. Also, it becomes possible to prevent the defective detection of the carriage 2 position and the defective operation thereof due to the ink mist adhesion to the reading sensor 10.

Further, the air that flows in the direction indicated by the arrow C1 in FIG. 1 is blown onto the recovery unit 30 to make it possible to blow away the ink mists that may be generated in the preliminary discharge receptacle portion (not shown) arranged for the recovery unit 30 which is used for the maintenance of the discharge performance of the recording head 1. Thus, the ink mists are blown away in the direction indicated by the arrow C2 in FIG. 1 when the recording head 1 performs the preliminary discharges. At the same time, it becomes possible to prevent any insufficient recovery of the performance of the recording head 1 due to the adhesion of ink mists to the capping means and wiping means (not shown) arranged for the recovery unit 30.

Further, in accordance with the present embodiment, the air flow is formed so that it flows from the standard side to the non-standard side of the ink jet recording apparatus, thus making it possible to generate the air flow that may efficiently blow away the ink mists that may be generated when ink is discharged from the recording head 1 to the recording material, while the carriage 2 travels from the standard side to non-standard side. In other words, the air flow generated by means of the fans 50 and 60 offsets the air flow that may be generated in the reverse direction to the one indicated by the arrow C2 in FIG. 1 due to the negative pressure portion that may be generated in the back side of the direction in which the carriage 2 travels. In this manner, the spread of ink mists is blocked in the interior of the ink jet recording apparatus. Here, in general, if color images should be recording on a recording material in high density and high precision, it is often practiced to discharge ink only when the carriage 2 travels from the standard side to non-standard side in order to enhance the impact precision on the recording material. Therefore, such structure as describe above is particularly effective for the execution of color image recording in high density and high precision.

Also, the upstream side of the sheet pressure plate 14 is extended to cover the portion where a plurality of pinch rollers 12 and others are arranged in the width direction of a recording material in order to prevent the passage of air flow on this portion becomes irregular. In this manner, the air flow passage is formed without any irregularities so as to effectuate the efficient air flow in food form.

By the air flow formed in the direction indicated by the arrow C1 in FIG. 1, ink mists flow in the direction indicated by the arrow C2 so that the ink mists tend to flow out of the ink jet recording apparatus. However, the ink mists are sucked into the ink mist suction port 41 by means of the fan 60 arranged on the non-standard side of the ink jet recording apparatus, hence making it possible to prevent the ink mists from escaping externally, because the ink mists are sucked into the ink mist suction port 41.

Now, with the fan 60 being arranged on the non-standard side, there is no possibility that the formation of the air flow from the standard side to non-standard side is implemented, because the fan 50 is arranged.

In accordance with the present embodiment, among the ink mist suction ports 41, those positioned farther away form the joint portion 40a that connects the spur base 40 and the fan 60, that is, the suction ports which are positioned on the standard side of the ink jet recording apparatus, are formed wider in the width direction of a recording material, hence making the flow path resistance in the interior of the spur base 40 uniform so as to substantially equalize the air flow rate which is sucked into each of the suction ports 41. Further, since the suction ports 41 on the standard side are made larger, it becomes possible to effectively suck the ink mist which may be generated on the preliminary discharge receptacle portion of the recovery unit 30 positioned on the standard side. Moreover, it becomes possible to prevent the ink mists from spreading in the vicinity of the important members required for the maintenance of the performance of the recording head 1, such as capping means and wiping means which are not shown.

The connection between the spur base 40 and the relay duct 61 is made easily and reliably by inserting the joint portion 40a into the rubber joint 42. As a result, the attachment and detachment of the spur base 40 can be made easily. Then, in such case where the ink jet recording apparatus should be used for a long time; ink mists are deposited in the spur base 40 to lower the performance of the ink mist suction; or the ink mists are deposited on the spur 16 to cause the images recorded on a recording material to be stained, among some others, only the spur base 40 can be removed easily for cleaning.

Now, the detailed description will be made of the collector sheets 91 and 92 for collecting and removing ink mists.

The collector sheets 91 and 92 which serve as the electric field formation members are attached to the wall face (the ceiling portion) of the air flow passage in the interior of the spur base 40, and to the wall face (the bottom face portion) of the air flow passage in the interior of the relay duct 61. By the application of static electricity, the collector sheets 91 and 92, which are formed by unwoven electret fibers, collect ultrafine ink mists which exist nearby.

The collector sheets 91 and 92 can be arranged in any positions unless these sheets are used as the filters that block the air flow. These sheets can collect ink mists nearby by the application of static electricity when arranged within the air flow passage. In accordance with the present embodiment, the first collector sheet 91 is attached to the ceiling portion of the spur base 40, and the second collector sheet 92 is attached to the bottom portion of the relay duct 61, respectively. Therefore, these sheets do not block the air flows at D and F in FIG. 4. These do not incur any pressure loss against the air flow generated by the presence of the fans 50 and 60, either. Thus, it becomes possible to collect ultrafin4 ink mists that exist nearby.

Also, the collector sheets 91 and 92 are attached to the portions where the air flow passage changes greatly. For the present embodiment, these are attached to the passage wall surfaces where the passage changes almost at right angles as clear from the representation of FIG. 3. In this way, due to the disturbance of the air flow caused by the changing passages, the opportunities are increased for the collector sheets 91 and 92 to collect even the ink mists that float on the positions away from the wall surfaces.

Also, since the collector sheets 91 and 92 are arranged in the interior of the spur base 40 which is the member easily exchangeable or removable by the user, it is possible to replace new collector sheets 91 and 92 along with the replacement of the spur base 40 when the ink mist collection performance of the collector sheets 91 and 92 are lowered as a result of the ink mists have been collected by the collector sheets 91 and 92 in a large amount.

In accordance with the present embodiment, the electret fiber collector sheets are used as the electric field formation members in order to keep the electric polarization semipermanently. However, this member is not necessarily formed by fibers. It may be possible to use some other electret. Further, the member is not necessarily limited to the electret. For example, it may be possible to utilize the electrostatic power by use of a power-supply or it may be possible to use the electrostatic plate or the like. Also, it may be possible to process the wall material that forms the air flow passage so as to generate a desired electrostatic power directly.

The ink mists that cannot be collected by the collector sheets 91 and 92 and allowed to flow together with the air flows at F1 and F2 in FIG. 5 are collected by the filter unit 180 formed by the filters 71 and 81. With the provision of the filter unit 180, it become possible to reliably block the ink mists to flow out externally.

Now, the ink mist collection by the filer unit 180 will be described further in detail. the honeycomb filets 171 and 172 collect the ink mists by utilization of inertia. The air flow is divided by the contact with the walls and collected in such a state that the pressure loss is made smaller to make clogging difficult due to the air passage through the air passage holes. Further, the air flow passage is bent so that ink mists tend to collide with the walls, hence increasing the collector efficiency.

On the other hand, the sheet type filters 173 and 174 are provided with the air passage gaps which are sufficiently smaller than the air passage holes of the honeycomb filters 171 and 172. Thus, when the air passes them, a greater collector efficiency is obtainable than the honeycomb filters 171 and 172 by the inertial collision of the ink mists. Further, since the ink mists are allowed to move extremely near the electret fibers, it is possible to make the collector efficiency higher by means of the electrostatic adsorption.

With the higher ink mist collector capability, it should be sufficient if only the sheet type filters 173 and 174 are arranged in terms of the performance thereof per se. However, from the long range view, the greater the ink mist collector capability, the easier the clogging may take place due to the deposition of the ink mists thus collected. Then, there is a possibility that the air permeability becomes insufficient. In this case, the ink mist suction from the suction port becomes insufficient, and the ink mists tend to spread in the interior of the recording apparatus. Therefore, on the upstream side of the sheet type filets 173 and 174, the honeycomb filters 171 and 172 are arranged, which can hardly be clogged although the collector capability is smaller than the sheet type filters 173 and 174. Then, further on the upstream side thereof, the collector sheets 91 and 92 are arranged so that ink mists are collected only by the application of the electrostatic adsorption with almost no pressure loss. In this manner, it is attempted to prolong the life of the sheet type filters 173 and 174.

The generation of ink mists is caused by the ink spreading when ink is discharged from the recording head 1, and the ink spreading when the ink droplets collide with a recording material. Therefore, the size of ink mists are greatly varied. In general, however, it becomes easier to collect them by the utilization of its inertia if the diameter of ink mist become larger. The honeycomb filters 171 and 172 are arranged on the upstream side to collect ink mists mostly by the utilization of inertia so as to collect most of the ink mists having the large diameter on the upstream side. Then, the ink mists having the smaller diameter which have passed the honeycomb filters 171 and 172 are collected by the sheet type filters 173 and 174, which are provided with the small passage gaps and arranged on the downstream side. In this way, it becomes possible to collect the ink mist efficiently, while suppressing the clogging of the sheet filters 173 and 174.

Further, the faster the air flow, the easier it becomes possible to collect the particles having the larger diameter by means of inertia. Therefore, it is effective to position the honeycomb filters 171 and 172, which are used to collect the ink mists mainly by the utilization of inertia, nearer to the blow out port of the fan 60 which provides the faster air flow rate with a greater disturbance of the air. In this respect, if the flow path resistance is provided in the air flow passage by the provision of a fan, the pressure loss is smaller when such means is arranged on the blow out side than the suction side. Therefore, the filter unit 71 is arranged on the downstream side of the fan 60.

In accordance with the present embodiment, the electret is used as the material for the honeycomb filters 171 and 172 and the sheet type filters 173 and 174. Therefore, the collectors effect produced by the static electricity is enhanced more. In the other words, since it is desirable to provide the higher collector effect for the honeycomb filters 171 and 172 without a smaller loss of the pressure, the use of the electret is effective, because the electret can collect the mists of smaller granular diameter. Also, the smaller the granular diameter, the easier becomes the adsorption by the application of static electricity. Therefore, it is also effective to use the electret for the sheet type filters 173 and 174, because these filters collect the ink mists of smaller diameter which are allowed to pass the honeycomb filters 171 and 172. Further, the electret is used for the collector sheets to make it possible to collect the ink mists of smaller diameter as much as possible. In this respect, it is to be understood that the use of general unwoven fibers other than the electret for each of the filters is still within the range of the technical thought of the present invention.

In accordance with the present embodiment, there are arranged gaps 177 and 178 by use of the spacers 175 and 176 between the honeycomb filter 172 and the sheet type filter 173, and between the sheet type filters 173 and 174 themselves. In this manner, the air is drown around to prevent the sheet filters 173 and 174 from being confronted with any unusable areas, and at the same time, it becomes possible to use the entire surface of the sheet type filter 174 even if the sheet type filter 173 is locally clogged, for example.

As described above, the filter unit 180 formed integrally with the honeycomb filters 171 and 172, the sheet filters 173 and 174, the spacers 175 and 176, and the sponge 179 is used to make it easer to execute the assembling, and at the same time, to prevent the air flow from leaking in the direction toward the filter side. Also, it becomes easier to replace filters, and also, easier to make shielding between each of the filters. The distribution of the air between each of the filters and the duct inner walls can be easily blocked at the same time. Also, with the structure thus arranged, the order in which the honeycomb filters 171 and 172, and sheet type filters 173 and 174 are arranged is important to obtain the collector efficiency as described above. However, since these filters are arranged in the unit structure, there is no possibility that such order is wrongly applied, and also, the assembling and replacement can be performed easily.

As described above, with the filter unit 180 of the present embodiment, it is easy to assemble and replace the filters capable of collecting ink mist efficiently without making the pressure loss of the air flow greater. Also, with the prevention of the air leakage from the filter unit, as well as the prevention of the air leakage between filters and the installation portion thereof in the apparatus, it becomes possible to prevent the interior and exterior of the apparatus from being stained by the ink mists. Further, at the time of assembling and replacement, it is easy to install the filters at the optimal positions. Then, with the prevention of stains in the interior of the recording apparatus, particularly with the prevention of the ink mist deposition on the parts where the defective operation amy take place due to the deposition of such stains, it becomes possible to record images stable for a long time, hence enhancing the reliability of the apparatus significantly.

Further, the air distribution passage of the honeycomb filter is bent in its formation or the honeycomb filers are structured with unwoven electret fibers, and also, the sheet type filters are structured with unwoven electret fibers, hence making it possible to enhance the ink mist collector efficiency.

Also, the filter unit is structured so that the honeycomb filters are positioned on the upstream side of the ink mist flowing path, and the sheet type filters are positioned on the downstream side thereof. The ink mist removal means generates the air flow to control the flow of ink mists, and the structure is arranged so that the filter unit is arranged on the downstream side of the ink mist removal means. As a result, the ink mist collector efficiency is enhanced still more.

Further, in accordance with the present embodiment, the collector sheets 91 and 92 are arranged on the upstream side of the air flow passage when observed from the filter unit 180 side. In general, if the effect of the ink mist collection by use of the filter unit 180, the mesh (gaps) of the filters 71 and 81 should become smaller. As a result, the pressure loss of the air flow is encountered to lower the suction efficiency of the suction port 41. Also, with the collection of a large amount of ink mists, the filters 71 and 81 are gradually clogged, hence inviting further reduction of the suction efficiency of the suction port 41. Therefore, in accordance with the present embodiment, the collector sheets 91 and 92 are arranged as the first ink mist removable means along the circumference of the air flow passage without impeding the movement of the air flow. Then, on the downstream side thereof the filter unit 180 is arranged as the second mist removal means to face the air flow. Also, it is more preferable to make the first ink mist removal means replaceable, because as compared with the second mist removable means, the first one is more liable to be stained by the adhesion of ink mists. With the structure thus arranged, it becomes possible to prolong the life of the second ink mist removal means. Also, it is more preferable to arrange the fan between the first ink mist removal means and the second ink mist removal means as means for generating the air flow between them. Then, it becomes possible to send air flow to the second ink mist removal means in good efficiency. Also, it is more preferable to combine the second ink mist removable means with the honeycomb structured filters and sheet type filters from the upstream side of the air flow. Then, it becomes possible to remove ink mists more effectively. Also, it is more preferable to arrange the second ink mist removable means as the replaceable unit. Then, it becomes easier to execute the replacement operation thereof. It is still more preferable to adsorb mists with the first ink mist removable means and the second ink mist removable means by the utilization of static electricity. Then, it becomes more effective to adsorb and remove the ink mists that float in the air.

As described above, in accordance with the present embodiment, using both the collector sheets 91 and 92, and filters 71 and 81 the ink mist collector effect and removal effect are enhanced, while preventing the pressure loss of the air flow and the suction efficiency of the fans.

In accordance with the present embodiment, the ink mists that float in the air flow passage can be collected by the utilization of the static electricity which is generated by the electric field formation members. With this arrangement, the mist collection is possible without making the pressure loss of the air flow greater. The ultrafine ink particles that spread in the interior of the recording apparatus can be sucked and collected efficiently.

As a result, the stains in the interior of the recording apparatus can be prevented to avoid the deposition of the ink mists on the parts that may cause the defective operation particularly due to the deposition of such stains. Thus, it becomes possible to record images stably for a long time, and the reliability of the apparatus is enhanced significantly.

What is claimed is:

1. An ink jet recording apparatus for forming an image on a recording medium using an ink jet recording head for discharging ink to record the image, said apparatus comprising:

conveying means for conveying said recording medium;

an air path forming member which forms an air path to expel air including an ink mist generated upon ink discharge by said ink jet recording head from a space where said ink jet recording head performs recording to outside; and an electrical field forming member provided on an inner wall surface of said air path forming member and along an expelling direction of a flow of the air including the ink mist.

2. An ink jet recording apparatus according to claim 1, wherein said electrical field forming member is formed by an electret.

3. An ink jet recording apparatus according to claim 1, further comprising an air flow generator to generate an air flow in the air path.

4. An ink jet recording apparatus according to claim 3, wherein said air flow generator further comprises a fan for sucking air exhausted from a downstream side of said conveying means.

5. An ink jet recording apparatus according to claim 1, wherein said electrical field forming member is replaceable together with a portion of said air path forming member.

6. An ink jet recording apparatus according to either claim 3 or claim 4, wherein said air flow generator further comprises a fan for blowing out air outside from an upstream side of said conveying means.

7. An ink jet recording apparatus according to either one of claim 1 to claim 3, wherein a filter unit is arranged with honeycomb filters and sheet type filters laminated in said air path.

8. An ink jet recording apparatus according to claim 7, wherein an air distribution passage of said honeycomb filters is bent.

9. An ink jet recording apparatus according to claim 7, wherein said honeycomb filters are formed by unwoven electret fibers.

10. An ink jet recording apparatus according to claim 7, wherein said sheet type filters are formed by unwoven electret fibers.

11. An ink jet recording apparatus according to claim 7, wherein for said filter unit, said honeycomb filters are arranged to be positioned on an upstream side of said air path, and said sheet type filters on a downstream side thereof.

12. An ink jet recording apparatus according to claim 7, wherein said air flow generator generates the air flow to form the flow of said ink mist, and said filter unit is arranged on a downstream side of said electrical field forming member.

* * * * *

UNITED STATES PATENT AND TRADEMARK OFFICE
CERTIFICATE OF CORRECTION

PATENT NO. : 6,464,328 B1
DATED : October 15, 2002
INVENTOR(S) : Soichi Hiramatsu et al.

It is certified that error appears in the above-identified patent and that said Letters Patent is hereby corrected as shown below:

Title page,
Item [57], ABSTRACT,
Line 6, "arranged" should read -- are arranged --; and
Line 8, "possible" should read -- possible. --.

Column 1,
Line 18, "caused it" should read -- cause it to be --

Column 2,
Line 5, "apparats" should read -- apparatus --; and
Line 36, "accordance" should read -- accordance with --.

Column 3,
Line 4, "heading" should read -- heating --.

Column 4,
Line 49, "filed" should read -- field --.

Column 5,
Line 40, "brown" should read -- blown --;
Line 53, "filer" should read -- filter --, and
    "exhausted" should read -- is exhausted out --.

Column 6,
Line 44, "demand in" should read -- demand for --.

Column 7,
Lines 6 and 7, "move" should read -- moves --.

Column 8,
Line 13, "describe" should read -- described --;
Line 20, "becomes" should read -- from becoming --;
Line 22, "food" should read -- good --; and
Line 60, "time;" should read -- time, --.

Column 9,
Line 20, "ultrafin4" should read -- ultrafine --;
Line 37, "have" should read -- having --;
Line 57, "filer" should read -- filter --; and
Line 58, "the" should read -- The --, and
    "filets" should read -- filters --.

UNITED STATES PATENT AND TRADEMARK OFFICE
CERTIFICATE OF CORRECTION

PATENT NO. : 6,464,328 B1
DATED : October 15, 2002
INVENTOR(S) : Soichi Hiramatsu et al.

It is certified that error appears in the above-identified patent and that said Letters Patent is hereby corrected as shown below:

<u>Column 10,</u>
Line 17, "filets" should read -- filters --;
Line 31, "become" should read -- becomes --; and
Line 60, "enhanced more" should read -- further enhanced. --, and
      "the other" should read -- other --.

<u>Column 11,</u>
Line 13, "drown" should read -- drawn --;
Line 45, "amy" should read -- may --; and
Line 50, "filers" should read -- filters --.

Signed and Sealed this

Thirteenth Day of May, 2003

JAMES E. ROGAN
*Director of the United States Patent and Trademark Office*